United States Patent
Mehas et al.

(10) Patent No.: US 10,132,650 B2
(45) Date of Patent: Nov. 20, 2018

(54) APPARATUSES AND RELATED METHODS FOR DETECTING MAGNETIC FLUX FIELD CHARACTERISTICS WITH A WIRELESS POWER TRANSMITTER

(71) Applicant: Integrated Device Technology, Inc., San Jose, CA (US)

(72) Inventors: Gustavo J. Mehas, Mercer Island, WA (US); David F. Wilson, Soquel, CA (US); Nicholaus W. Smith, Duluth, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 267 days.

(21) Appl. No.: 14/603,296

(22) Filed: Jan. 22, 2015

(65) Prior Publication Data

US 2016/0218559 A1 Jul. 28, 2016

(51) Int. Cl.
*H02J 5/00* (2016.01)
*G01D 5/20* (2006.01)
(Continued)

(52) U.S. Cl.
CPC ............... *G01D 5/20* (2013.01); *H02J 5/005* (2013.01); *H02J 50/12* (2016.02); *H02J 50/60* (2016.02);
(Continued)

(58) Field of Classification Search
CPC .... B60L 5/005; B60L 11/182; B60L 2250/22; H01F 38/14; H02J 5/005; H02J 7/025;
(Continued)

(56) References Cited

U.S. PATENT DOCUMENTS 6,473,652 B1 10/2002 Sarwal et al.
9,570,231 B2 2/2017 Miyamoto et al.
(Continued)

FOREIGN PATENT DOCUMENTS

WO 2014202818 A1 12/2014

OTHER PUBLICATIONS

International Search Report for PCT Application No. PCT/US2016/014580 Issued by the U.S. International Searching Authority dated Mar. 29, 2016; pp. 1-2.
(Continued)

*Primary Examiner* — Levi Gannon
(74) *Attorney, Agent, or Firm* — Haynes and Boone, LLP.

(57) ABSTRACT

A wireless power transmitter may include a transmit coil configured to generate a wireless power signal for wireless power transfer, at least one secondary sensing coil configured to generate a signal responsive to a magnetic flux field generated during the wireless power transfer, and control logic configured to detect at least one condition of a wireless power transfer system responsive to detecting distortion in the magnetic flux field from the at least one signal received from the secondary sensing coil. A related method may include generating with a wireless power transmitter a wireless power signal, generating with a plurality of secondary sensing coils one or more signals responsive to a magnetic flux field generated during the wireless power transfer, and detecting at least one condition of a wireless power transfer system responsive to the one or more signals generated by the plurality of secondary sensing coils.

20 Claims, 7 Drawing Sheets

(51) Int. Cl.
*H02J 50/60* (2016.01)
*H04B 5/00* (2006.01)
*H02J 50/12* (2016.01)
*H02J 50/70* (2016.01)
*H02J 50/90* (2016.01)

(52) U.S. Cl.
CPC .............. *H02J 50/70* (2016.02); *H02J 50/90* (2016.02); *H04B 5/0037* (2013.01)

(58) Field of Classification Search
CPC .. H02J 17/00; H02J 50/10; H02J 50/12; H02J 50/60; H02J 50/70; H02J 50/90; H04B 5/0037; H04B 5/0075; H04B 5/0087; H04B 5/0093; Y02T 10/7088; Y02T 90/10; Y02T 90/12; Y02T 90/122; Y02T 90/125; Y02T 90/128
USPC ....................................................... 307/104
See application file for complete search history.

(56) References Cited

U.S. PATENT DOCUMENTS

| | | | |
|---|---|---|---|
| 2011/0004278 A1* | 1/2011 | Aghassian | A61N 1/3787 607/61 |
| 2012/0313579 A1 | 12/2012 | Matsumoto et al. | |
| 2012/0326662 A1 | 12/2012 | Matsumoto et al. | |
| 2013/0024059 A1 | 1/2013 | Miller et al. | |
| 2013/0093252 A1 | 4/2013 | Norconk et al. | |
| 2013/0093257 A1* | 4/2013 | Goto | H02J 5/005 307/104 |
| 2013/0127255 A1* | 5/2013 | Tsujimoto | H04B 5/0087 307/104 |
| 2013/0169062 A1* | 7/2013 | Maikawa | H02J 50/10 307/104 |
| 2013/0241300 A1* | 9/2013 | Miyamoto | H01F 5/003 307/104 |
| 2013/0264887 A1 | 10/2013 | Arisawa et al. | |
| 2014/0015329 A1 | 1/2014 | Widmer et al. | |
| 2014/0091787 A1 | 4/2014 | Hyodo | |
| 2015/0137801 A1 | 5/2015 | Raedy et al. | |
| 2015/0155095 A1 | 6/2015 | Wu et al. | |
| 2015/0349542 A1* | 12/2015 | Yamamoto | G01V 3/10 307/104 |

OTHER PUBLICATIONS

Written Opinion for PCT Application No. PCT/US2016/014580 Issued by the U.S. International Searching Authority dated Mar. 29, 2016; pp. 1-6.

\* cited by examiner

APPARATUSES AND RELATED METHODS FOR DETECTING MAGNETIC FLUX FIELD CHARACTERISTICS WITH A WIRELESS POWER TRANSMITTER

CROSS-REFERENCE TO RELATED APPLICATION

The present disclosure is related to U.S. patent Ser. No. 14/603275, filed on Jan. 22, 2015, which is herein incorporated by reference in its entirety.

FIELD

Embodiments of the present disclosure relate generally to wireless power transfer and, more particularly, to apparatuses and related method for detecting magnetic flux field characteristics during wireless power transfer.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coils is one method considered as an un-tethered method for transferring power wirelessly through a coupled wireless power signal. In wireless power transmission, power is transferred by transmitting a wireless power signal through a transmit coil. On the receiver side, a receive coil may couple with the transmit coil through the wireless power signal, thus, receiving the transmitted power wirelessly. The distance between the transmitter coil and receive coil, at which efficient power transfer can take place, is a function of the transmitted energy, the distance, and the alignment of the power transfer coils. The coupling coefficient (k) is a function of the distance and alignment between the coils, the coil sizes, and materials. The power conversion efficiency (e.g., coupling factor, coupling quality) may be significantly improved if the coils are sized and operated at such a frequency that they are physically within the so-called "near-field zone" of each other.

An issue encountered during wireless charging transmission includes situations when the transmitter and receiver are weakly coupled, which may occur due to misalignment of the transmitter and receiver, the presence of a foreign object, or for other reasons. These issues may cause the wireless power transfer to be less efficient, which may also result in excess heat. Conventional foreign object detection methods may rely on coil temperature measurements (coils tend to heat up when foreign objects are present), or comparing the input power to output power to determine if the output power is within an expected efficiency threshold (e.g., 350 mW). These methods may fail because the efficiency estimate may be unreliable regarding for some typical operating conditions, which may result in errors in detection.

BRIEF SUMMARY

Embodiments of the present disclosure include a wireless power enabled apparatus, comprising a wireless power transmitter. The wireless power transmitter includes a transmit coil configured to generate a wireless power signal for wireless power transfer to a wireless power receiver, at least one secondary sensing coil configured to generate a signal responsive to a magnetic flux field generated during the wireless power transfer, and control logic operably coupled with the at least one secondary sensing coil. The control logic is configured to detect at least one condition of a wireless power transfer system responsive to detecting distortion in the magnetic flux field from the at least one signal received from the secondary sensing coil.

Another embodiment of the present disclosure includes a wireless power enabled apparatus comprising a wireless power transmitter. The wireless power transmitter includes a transmit coil configured to generate a wireless power signal from an input signal, a plurality of secondary sensing coil located in proximity of the transmit coil, and control logic operably coupled with the plurality of secondary sensing coils. Each secondary sensing coil is configured to generate a signal of a magnetic flux field generated during wireless power transfer to a wireless power receiver. The control logic is configured to detect at least one condition of a wireless power transfer system based, at least in part, on a measured combination of inputs from the signals generated by the plurality of secondary sensing coils.

Another embodiment of the present disclosure includes a method of detecting a condition of a wireless power transfer system. The method comprises generating with a wireless power transmitter a wireless power signal for wireless power transfer to a wireless power receiver, generating with a plurality of secondary sensing coils one or more signals responsive to a magnetic flux field generated during the wireless power transfer, and detecting at least one condition of a wireless power transfer system responsive to the one or more signals generated by the plurality of secondary sensing coils.

DETAILED DESCRIPTION

Figure 1:
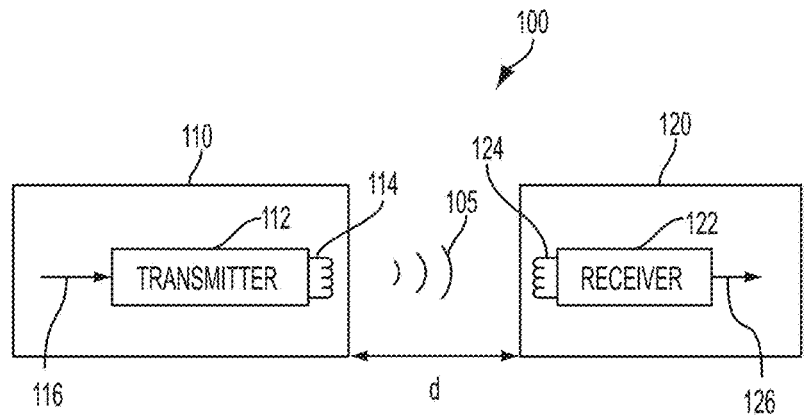
FIG. 1 is a schematic block diagram of a wireless power transfer system.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. All of which may be termed "control logic."

A general-purpose processor may be a microprocessor, but in the alternative, the general-purpose processor may be any processor, controller, microcontroller, or state machine suitable for carrying out processes of the present disclosure. A processor may also be implemented as a combination of computing devices, such as a combination of a DSP and a microprocessor, a plurality of microprocessors, one or more microprocessors in conjunction with a DSP core, or any other such configuration.

A general-purpose processor may be part of a general-purpose computer, which should be considered a special-purpose computer when configured to execute instructions (e.g., software code) for carrying out embodiments of the present disclosure. Moreover, when configured according to embodiments of the present disclosure, such a special-purpose computer improves the function of a general-purpose computer because, absent the present disclosure, the general-purpose computer would not be able to carry out the processes of the present disclosure. The present disclosure also provides meaningful limitations in one or more particular technical environments that go beyond an abstract idea. For example, embodiments of the present disclosure provide improvements in the technical field of wireless power transfer and, more particularly, to apparatuses and related method for detecting magnetic flux field characteristics during wireless power transfer.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

It should be recognized that the devices of a wireless power transfer system is described herein primarily with respect to functionality of wireless power transfer; however, it should be recognized that the wireless power transfer system may include additional components to perform other features not specifically described herein or shown in the various figures. For example, wireless power enabled devices may include communication modules, I/O modules for interfacing with a user, memory for storing instructions and data, various sensors, processors, controllers, voltage regulators, among other components. The figures and accompanying description may, therefore, be somewhat simplified to focus on the various apparatuses and methods that are configured to provide wireless power transfer and detection of characteristics of the magnetic flux field and conditions of the wireless power transfer system.

FIG. 1 is a schematic block diagram of a wireless power transfer system 100. The wireless power transfer system 100 includes a wireless power transmitting apparatus 110, and a wireless power receiving apparatus 120. The wireless power transmitting apparatus 110 includes a wireless power transmitter 112 having a transmit coil 114 configured to generate a wireless power signal 105 (e.g., electric field, magnetic field, electromagnetic field, etc.) for providing power transfer (e.g., through inductive coupling) to the wireless power receiving apparatus 120. The wireless power receiving apparatus 120 includes a wireless power receiver 122 having a receive coil 124 configured to couple with the wireless power signal 105. The transmit coil 114 and the receive coil 124 may be sized according to the particular devices and applications to be associated therewith.

An input signal 116 may be provided to the wireless power transmitter 112 for generating the wireless power signal 105 that provides a power transfer to the wireless power receiving apparatus 120. The wireless power receiver 122 may couple to the wireless power signal 105 and may generate an output signal 126 in response thereto. The output signal 126 may provide the power that is used by the wireless power receiving apparatus 120 for storing (e.g., charging a battery), consumption (e.g., providing system power), or a combination thereof.

The wireless power transmitter 112 and the wireless power receiver 122 are separated by a distance (d). In some embodiments, the wireless power transmitter 112 and the wireless power receiver 122 may be configured according to a mutual inductance relationship, such that when the resonant frequency of the wireless power receiver 122 and the resonant frequency of the wireless power transmitter 112 are substantially identical, transmission losses between the wireless power transmitter 112 and the wireless power receiver 122 are minimal. Likewise, the frequency of the wireless power signal 105 may be set by the wireless power transmitter 112 at or near the resonant frequencies of the coils 114, 124. As a result, an effective power transfer may occur by coupling a large portion of the energy in the near-field of the transmit coil 114 to the receive coil 124 rather than propagating most of the energy in an electromagnetic wave to the far-field. If the wireless power receiving apparatus 120 is in the near-field (within some distance (d)), inductive coupling may occur between the transmit coil 114 and the receive coil 124. The area around the transmit coil 114 and receive coil 124 where this near-field inductive coupling may occur may be referred to as a "coupling region." Because of this mutual inductance relationship, the wireless power transfer may be referred to as inductive wireless power transfer.

The transmit coil 114 and the receive coil 124 may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area (e.g., secondary sensing coils). In addition, an air core loop may more readily enable placement of the receive coil 124 within a plane of the transmit coil 114 where the coupling region of the transmit coil 114 may be more powerful.

The wireless power receiving apparatus 120 may be a mobile electronic device, such as a cell phone, a smart phone, a media player (e.g., mp3 player, DVD player, etc.), an electronic reader, a tablet computer, a personal digital assistant (PDA), a camera, a laptop computer, and personal electronic device in which wireless power signal 105 may be received. The wireless power receiving apparatus 120 may also be a less mobile electronic device, such as a television, personal computer, media player (e.g., DVD player, Blu-ray player, etc.) or any other device that may operate by, and/or store electrical power. The wireless power receiving apparatus 120 may be one of a number of other items, such as an automobile or any other devices that may include batteries that may be charged through the wireless power transmitting apparatus 110.

The wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation. Thus, embodiments of the present disclosure include devices that may include a wireless charging transceiver configured to operate in either a transmit mode or a receive mode. Using the term "receiver" indicates that a device is configured to receive wireless power transfer, but should not be interpreted to mean that the device only operates as a receiver. Similarly, using the term "transmitter" indicates that the device is configured to transmit wireless power, but should not be interpreted to mean that the device only operates as a transmitter.

In operation, the user may place the wireless power receiving apparatus 120 in proximity of the wireless power transmitting apparatus 110; however, the receive coil 124 and the transmit coil 114 may not be aligned. The misalignment may be caused by user error when the user positions the wireless power receiving apparatus 120. Misalignment is also often caused by movement of the wireless power receiving apparatus 120 from its original placement from other forces (e.g., the wireless power receiving apparatus 120 may be bumped, moved by vibrations, etc.).

Regardless of the reasons for the misalignment, it may be desirable for the wireless power transmitting apparatus 110 to detect the misalignment, as even a small amount of mismatch between the receive coil 124 and the transmit coil 114 may lower the wireless power transfer efficiency. The reduced efficiency may result in wasted power, increased heat in the components, slower battery charging, among other undesirable issues. In addition to the reduced efficiency, built-up energy from fringing magnetic fields that result from misalignment may cause problems. For example, if the user quickly moves the wireless power receiving apparatus 120 so that the receive coil 124 moves back into alignment with the transmit coil 114, the sudden change from the built-up energy may overwhelm (e.g., burn) the components of the wireless power receiving apparatus 120. To protect against this situation, conventional wireless power receivers may include a clamp that is enabled to protect its components; however, even with clamps, large amounts of energy may still overwhelm and damage wireless power receivers in such situations. Thus, it may also be desirable for the wireless power transmitting apparatus 110 to detect misalignment with embodiments of the present disclosure.

Another problem that may occur during wireless power transfer includes a foreign object being present in the wireless charging field. The presence of the foreign object may also affect wireless power transfer efficiency, increase heat in the components of the wireless power transfer system 100 as well as in the foreign object itself, etc. Thus, it may also be desirable for the wireless power transmitting apparatus 110 to detect the presence of a foreign object with embodiments of the present disclosure.

Embodiments of the present disclosure include apparatuses and methods for monitoring characteristics of the magnetic flux field of the wireless power transfer system 100. For example, the wireless power transmitter 112 may include a plurality of secondary sensing coils (FIGS. 2 through 5) configured to detect the magnetic flux field in proximity of the transmit coil 114. In particular, the plurality of secondary sensing coils may generate a signal in response to the wireless power transmission; however, this signal may not be used for wireless power transfer to the wireless power receiving apparatus 120. Rather, this signal may provide the wireless power transmitting apparatus 110 with data that may be interpreted by the wireless power transmitting apparatus 110 to detect misalignment, foreign objects, and other conditions that may affect the magnetic flux field during wireless power transfer. The configuration and operation of the secondary sense coils will be discussed in further detail below with reference to FIGS. 2 through 5.

In response to detecting misalignment, the user may be notified and/or assisted in obtaining proper alignment of the receive coil 124 and the transmit coil 114. The wireless power transmitter 112 may also be configured to take additional appropriate measures (e.g., reduce transmitting power, shut down power, etc.) during a misalignment situation in order to reduce the built up energy, which may protect the components of the wireless power receiving apparatus 120 in case of sudden adjustments. The wireless power transmitting apparatus 110 may also be configured to communicate misalignment information to the wireless power receiving apparatus 120, which may also assist in the notification of the user and/or perform appropriate measures to protect itself from misalignment issues.

In addition, the user may be notified about the presence of a foreign object so that the user may remove the foreign object from the wireless charging field. The wireless power transmitter 112 may also be configured to take additional appropriate measures (e.g., reduce transmitting power, shut down power, etc.) responsive to detection of the presence of a foreign object. The wireless power transmitting apparatus 110 may also be configured to communicate foreign object information to the wireless power receiving apparatus 120, which may also assist in the notification of the user and/or perform appropriate measures to protect itself from misalignment issues.

Figure 2:
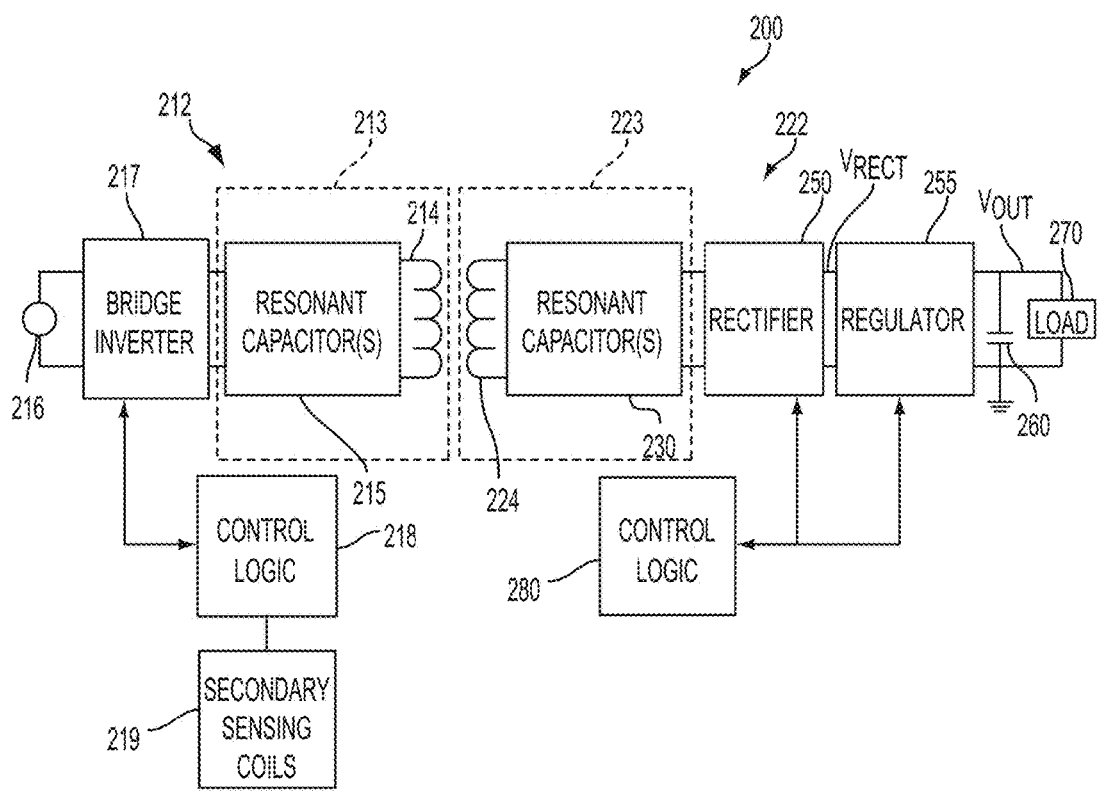
FIG. 2 is a schematic block diagram of a wireless power transfer system.

FIG. 2 is a schematic block diagram of a wireless power transfer system 200 according to an embodiment of the present disclosure. The wireless power transfer system 200 includes a wireless power transmitter 212 and a wireless power receiver 222. The wireless power transmitter 212 and the wireless power receiver 222 may be configured to couple with each other according to a mutual inductance relationship such that wireless power signal 105 (FIG. 1) may be transferred from the wireless power transmitter 212 to the wireless power receiver 222.

The wireless power transmitter 212 may include a resonant tank 213, a bridge inverter 217, and transmitter control logic 218 coupled together to generate the wireless power signal 105 transmitted to the wireless power receiver 222. The resonant tank 213 may include a transmit coil 214 coupled with resonant capacitors 215. The bridge inverter 217 of the wireless power transmitter 212 may include a full bridge inverter, a half bridge inverter, or other appropriate circuit for receiving a DC input signal 216 and generate an AC signal through the transmit coil 214 for generating the wireless power signal 105. The wireless power transmitter 212 may further include secondary sensing coils 219 coupled with the transmitter control logic 218. The secondary sensing coils 219 may be configured to sense characteristics (e.g., the density, magnitude, etc.) of magnetic flux field lines in proximity of the transmit coil 214. Thus, the secondary sensing coils 219 may be passively coupled with the transmitter control logic 218 to provide the transmitter control logic 218 with data corresponding to the magnetic flux field present during wireless power transfer.

The wireless power receiver 222 includes a resonant tank 223, rectifier 250, and a regulator 255, and control logic 280 coupled together to receive the wireless power signal 105 and generate an output signal ($V_{OUT}$) in response thereto. The output signal ($V_{OUT}$) may be provided to a load 270 (e.g., a battery, system components, etc.), which may also have an output capacitor 260. The resonant tank 223 may include a receive coil 224 coupled with resonant capacitors 230. The wireless power transmitter 212 and the wireless power receiver 222 may be incorporated within a wireless power transmitting apparatus 110 (FIG. 1) and a wireless power receiving apparatus 120 (FIG. 1), respectively. The transmit coil 214 and the receive coil 224 (and other components) may be sized according to the particular devices and applications to be associated therewith.

The wireless power transmitter 212 and wireless power receiver 222 may be generally configured as discussed above with respect to FIG. 1. The configurations of the LC networks within the resonant tanks 213, 223 may generally determine the resonant frequencies of the wireless power transmitter 212 and the wireless power receiver 222, respectively. For example, the resonant frequency of the resonant tanks 213, 223 may be based on the inductance of their respective inductive coil and the capacitance of the plates of the capacitors.

During wireless power transmission, the input signal 216 (a DC signal) may be received by the bridge inverter 217. The bridge inverter 217 may generate an AC current that flows through the resonant tank 213 to generate a time-varying signal for transmitting the wireless power signal 105. Thus, the wireless power signal 105 may be a time-varying signal that is substantially sinusoidal, having a frequency that may be based on the switching frequency of the bridge inverter 217 of the wireless power transmitter 212. In some embodiments, the frequency of the wireless power signal 105 may be set according to the desired frequency, such as a frequency for a particular wireless power standard. The resonant tank 213 may be configured such that the resonant frequency is approximately the frequency of the wireless power signal 105. In some embodiments, it may be desirable for the frequency of the wireless power signal 105 to differ somewhat from the resonant frequency of the resonant tank 213, such as to reduce the peak-to-peak current through the transmit coil 214.

In order to receive wireless power signal 105, the wireless power receiver 222 may be placed in the coupling region of the wireless power transmitter 212 such that inductive coupling may be achieved. As a result, the wireless power receiver 222 may receive the wireless power signal 105 and generate an AC power responsive thereto. In order for the power to be used by the load 270, the AC power may be converted to a DC power. The rectifier 250 may generate a rectified voltage ($V_{RECT}$) as well as a rectified current ($I_{RECT}$) flowing through the resonant tank 223. In some embodiments, the rectifier 250 may be configured as a synchronous rectifier. As a result, the rectifier 250 may include one or more switches that are controlled in such a manner to generate the DC output power signal (i.e., rectified voltage ($V_{RECT}$) and rectified current ($I_{RECT}$)). In some embodiments, the rectifier 250 may include one or more diodes configured to generate the DC output power signal.

The regulator 255 may receive the rectified voltage ($V_{RECT}$) and convert the rectified voltage to have a desired voltage level for the output voltage ($V_{OUT}$). For example, in some embodiments, the regulator 255 may convert the rectified voltage ($V_{RECT}$) from a low voltage to a relatively higher voltage for the output voltage ($V_{OUT}$). In some embodiments, the regulator 255 may convert the rectified voltage ($V_{RECT}$) from a high voltage to a relatively lower voltage for the output voltage ($V_{OUT}$). In some embodiments, the regulator 255 may invert the rectified voltage ($V_{RECT}$) from a positive voltage to a negative voltage, or vice versa. The regulator 255 may be configured according to one of a variety of different voltage regulator topologies. For example, the regulator 255 may be configured according to one or more of a buck topology, a boost topology, a buck-boost topology, an inverting topology, and a low dropout (LDO) topology. In some embodiments, the regulator 255 may be configured according to a transformer-based topology (e.g., forward, flyback, etc.). The operation of the regulator 255 may be controlled by the control logic 280 according to the topology being used.

The control logic 280 of the wireless power receiver 222 may be configured to control one or more operations of the wireless power receiver 222. Each of the control logic 218, 280 may be implemented within a processor (e.g., microcontroller) or other circuitry that is configured (e.g., programmed) to perform various operations of embodiments of the present disclosure. Each of the control logic 218, 280 may further include computer-readable media (e.g., memory) storing computing instructions for execution by the processor related to performing processes of the embodiments of the present disclosure. Memory may include volatile and non-volatile memory. In addition, each of the control logic 218, 280 may further control other functions of the respective wireless power transmitter 212, wireless power receiver 222, such as controls related to foreign object detection, device operation, etc. The control logic 218, 280 may each include different sub-blocks that perform one or more of the above functions separately rather than by employing within a single process, routine, program, etc. In addition, the control logic 218, 280 may each employ different hardware elements for different functions.

The highest efficiency power transfer may occur when the receive coil 224 and the transmit coil 214 are in positional alignment—that is, when the receive coil 224 is directly over the transmit coil 214. While in alignment, the magnetic flux field may be relatively symmetrical about the transmit coil 214, and the efficiency of power transfer may be substantially near its peak. As the receive coil 224 moves off alignment from the transmit coil 214, the efficiency of wireless power transfer may be reduced. In addition, the magnetic flux field may become distorted (e.g., asymmetrical) from its state when in alignment. For example, if the receive coil 224 is moved off center, the magnetic flux field may also be moved toward the receive coil 224 to concentrate in an area around the receive coil 224. It is noted that when discussing movement of either the transmitter 212 and its components, or the receiver 222 and its components, for purposes of this disclosure the movement is relative to each other. It is recognized that some wireless power transmitters 212 may be relatively stationary or even built into a stationary object. In such a situation, moving the wireless power transmitter 212 or its components may mean physically moving the wireless power receiver 222. Though it is less common, some wireless power receivers 222 may be relatively stationary and the wireless power transmitter 212 may be physically moved in that case.

The presence of a foreign object may likewise distort the magnetic flux field and reduce the efficiency of wireless power transfer. For example, the magnetic flux field may be concentrated in an area around the foreign object. As discussed herein, the secondary sensing coils 219 may be configured to sense characteristics (e.g., the density, magnitude, etc.) of magnetic flux field lines in proximity of the transmit coil 214. Such data may be useful in detecting misalignment of the transmit coil 214 and the receive coil 224, detecting the presence of foreign objects, among other useful situations.

Figure 3:
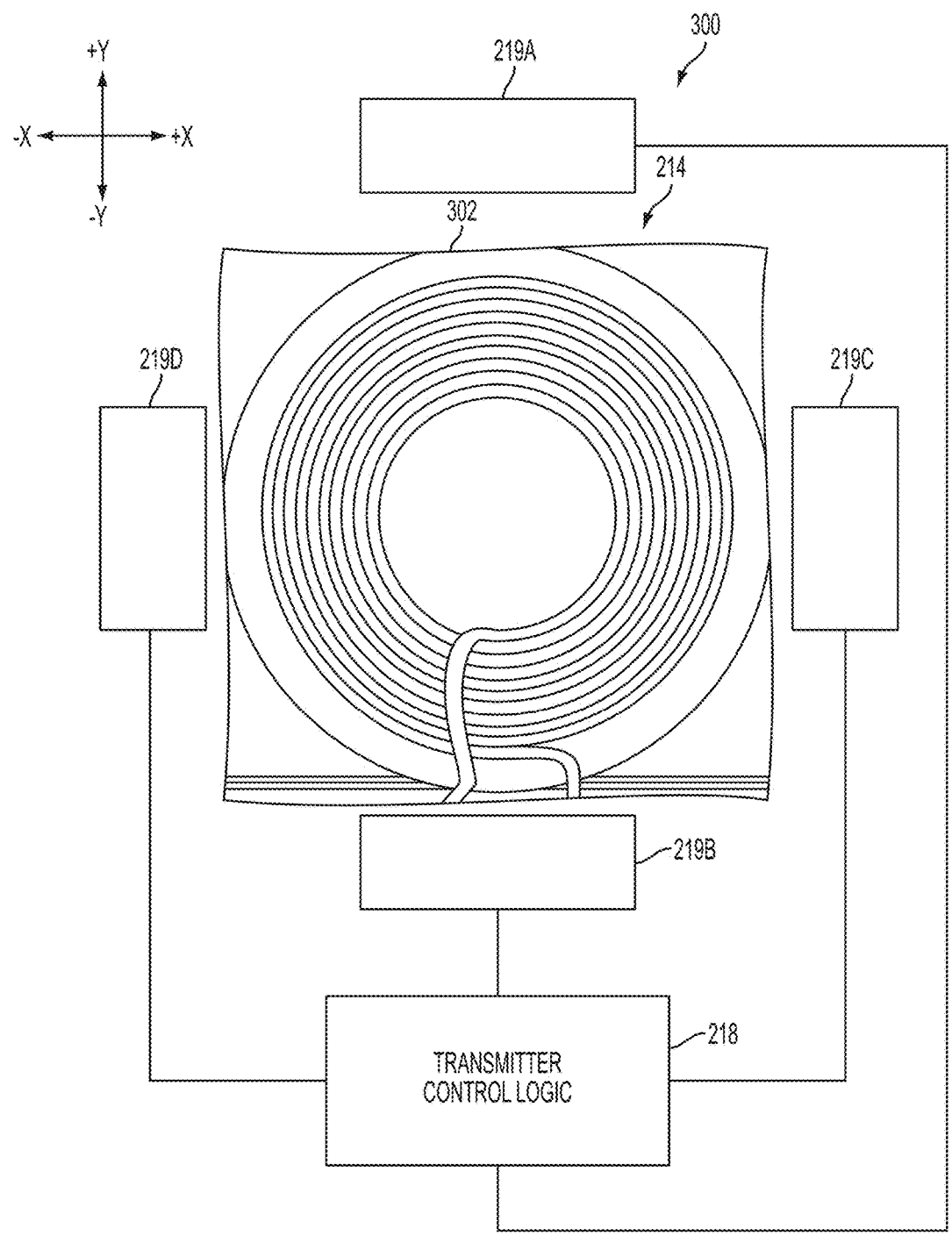
FIG. 3 is a schematic diagram of a wireless power transmitter with secondary sensing coils.

FIG. 3 is a schematic diagram of a wireless power transmitter 300 with secondary sensing coils 219A, 219B, 219C, 219D according to an embodiment of the present disclosure. As discussed above, the secondary sensing coils 219A, 219B, 219C, 219D are coupled with the transmitter control logic 218, and may be configured to sample the magnetic flux field in proximity of the transmit coil 214. Thus, the secondary sensing coils 219A, 219B, 219C, 219D may be positioned in proximity of the transmit coil 214 to sense characteristics (e.g., density, magnitude, etc.) of the magnetic flux field lines around the transmit coil 214. The transmit coil 214 may be substantially circular as shown in FIG. 3. Other transmit coil 214 geometries are also contemplated, including, but not limited to rectangular, triangular, etc. The secondary sensing coils 219A, 219B, 219C, 219D may also have various geometries, as desired.

Information about the magnetic flux field in relation to the wireless power transmitter 212 (FIG. 2) may be useful in determining how the wireless power transmitter 212 is driving the magnetic flux field, and identify different conditions of the wireless power transfer system 100. For example, the electrical measurements may be interpreted to determine the alignment (or misalignment) of the transmit coil 214 and the receive coil 224, the presence of a foreign object, etc. The wireless power transmitter 212 may identify such conditions through detecting distortion of the magnetic flux field through the information sampled by the secondary sensing coils 219A, 219B, 219C, 219D.

The secondary sensing coils 219A, 219B, 219C, 219D may positioned at locations to provide sample points along an X-axis and a Y-axis with the origin being approximately the center of the transmit coil 214. For example, a first secondary sensing coil 219A is located at a +Y location, a second secondary sensing coil 219B is located at a −Y location, a third secondary sensing coil 219C is located at a +X location, and a fourth secondary sensing coil 219D is located at a −X location. Of course, it is contemplated that embodiments may include more or fewer than four secondary sensing coils. In general, increasing the number of secondary sensing coils that are part of the system provides a better characterization of the magnetic flux field, which may enable the transmitter control logic 218 to identify more exceptions to the desired magnetic flux field as will be discussed in further detail below. In addition, it is contemplated that the secondary sensing coils 219A, 219B, 219C, 219D may positioned at locations that are not along the X-axis or Y-axis.

As shown in FIG. 3, each secondary sensing coil 219A, 219B, 219C, 219D may be independently coupled with the transmitter control logic 218. In other words, the transmitter control logic 218 may have a separate input pin coupled with each secondary sensing coil 219A, 219B, 219C, 219D. As a result, the four secondary sensing coil 219A, 219B, 219C, 219D of FIG. 3 may generate four independent measurements for the magnetic flux field sensed at each location.

In operation, the wireless power transmitter 212 may sense the magnetic flux field with the secondary sensing coils 219A, 219B, 219C, 219D. In particular, the secondary sensing coils 219A, 219B, 219C, 219D may generate a signal through inductance when in the presence of the magnetic flux field during wireless power transfer. The signal may be a voltage signal that is unrelated to the actual wireless power transfer to charge and/or provide power to the wireless power receiving apparatus 120 (FIG. 1). The signal from the secondary sensing coils 219A, 219B, 219C, 219D may be received and processed by the transmitter control logic 218. The processing may be analog or digital signal processing. The transmitter control logic 218 may sample the signal according to a desired sampling rate (e.g., 200 kHz) and analyze the sampled signal.

The transmitter control logic 218 may also interpret the sampled information (e.g., voltage measurements) to identify one or more conditions affecting the wireless power transfer system 100, such as alignment or misalignment of the transmit coil 214 and the receive coil 224, the presence of a foreign object, etc. For example, the transmitter control logic 218 may compare the sampled information to reference measurements to determine whether there is any distortion in the magnetic flux field, and to identify what conditions are causing the distortion to the magnetic flux field.

For simplicity of this description, the measurements may be referred to in terms of levels relative to its aligned state. In other words, the value of "1" may be used to indicate the level of the signal sampled by a corresponding secondary sensing coils 219A, 219B, 219C, 219D with the transmit coil 214 and the receive coil 224 in their aligned state, even though the actual measured voltage may be some other value (e.g., 3 V.). For example, in the aligned state, the four measurements of the secondary sensing coils 219A, 219B, 219C, 219D may be 1, 1, 1, 1 for the +Y, −Y, +X, −X positions, respectively. Another set of measurements may yield 0, 2, 1, 1, which may indicate that the transmit coil 114 and the receive coil 224 are misaligned in the −Y direction. It is noted that some embodiments may include some secondary sensing coils 219A, 219B, 219C, 219D that are counter wound so that some signals may have opposite polarities (e.g., 1, −1, 1, −1).

Various possible combinations for misalignment may be stored as reference measurement combinations in memory of the transmitter control logic 218. For example, a first reference measurement combination of inputs may be stored for a misalignment of 1 mm in the +X direction, a second reference measurement combination of inputs may be stored for a misalignment of 1 mm in the −X direction, a third reference measurement combination of inputs may be stored for a misalignment of 2 mm in the +X direction . . . and so on (e.g., 11 mm in the +X direction). Similarly, a plurality of reference measurement combinations of inputs may be stored for misalignments in the ±Y directions. In addition, a plurality of reference measurement combinations of inputs may be stored for misalignments in both the X and Y directions (e.g., 1 mm+X and 3 mm −Y, 4 mm −X and 7 mm+Y, and so on). Each of these reference measurement combinations may include a value for each input, and stored as a combination in a lookup table (e.g., in firmware).

Actual measurements during operation by the user may result in a combination of inputs that is compared to the reference measurement combinations stored in the transmitter control logic 218 to determine the misalignment, if any. For example, a measured combination of 3, 1, 3, 1 may be compared to the reference measurement combinations to determine that there is misalignment of the receive coil 224 both the +X and +Y directions. It should be noted that the combinations and corresponding amounts of misalignment are provided herein as examples only, and that the reference measurement combinations may depend on the operating point of the coils, the physical features of the coils, among other factors. Other combinations of measurements may provide information regarding other conditions. As a result, additional reference measurement combinations may be stored in the lookup table to detect those additional conditions. Thus, the lookup table may also include reference measurement combinations that provide a model of what the ideal behavior of the magnetic flux field should be during different conditions to have valid data.

In some situations (e.g., the presence of foreign objects), the combination from the actual measurements may not match any of the stored reference measurement combinations. For example, the actual measured combination may be 1, 1, 6, 1 for the +Y, −Y, +X, −X positions, respectively. Such a combination may not match any of the stored reference measurement combinations, which may indicate to the transmitter control logic 218 that a problem has occurred (e.g., a foreign object is present) that is not recognized as valid data. In other words, the measurements may differ from the reference measurement combinations in a way that is not recognized by the transmitter control logic 218. This difference may indicate that the distortion in the magnetic flux field may be attributed to something more than just misalignment, such as a foreign object. Thus, the determination for foreign object detection may at least partially based on identifying alignment. For example, if a known combination for alignment is present, then it is unlikely that the distortion is also caused by a foreign object and false triggers for foreign objects may be reduced.

The transmitter control logic 218 may also be configured to assist with corrective measures to these conditions. For example, to assist with the correction of misalignment, the wireless power transmitting apparatus 110 (FIG. 1) and/or the wireless power receiving apparatus 120 (FIG. 1) may notify the user of the misalignment. The notification may include visual notification (e.g., an image displayed on a graphical user interface, lighting LEDs to indicate direction, etc.), an audible notification (e.g., beep, voice instructions, alarm, etc.), a tactile notification (e.g., vibration), etc., and combinations thereof. The notification may also assist the user on how to correct the misalignment. For example, the user may be notified which direction the receive coil 224 and/or the transmit coil 214 should be moved to achieve alignment. As a result, the user may correct the misalignment of the transmit coil 214 and the receive coil 224 to improve the efficiency of the wireless power transfer system 100.

Another corrective measure may include the wireless power transmitter 112 reducing power transmission. In some embodiments, reducing the power transmission may include completely shutting off power transmission. Reducing power transmission may be a desirable remedy for conditions that may cause damage to the different components of the wireless power transfer system 100. As discussed above, if a misaligned transmit coil 214 and receive coil 224 are rapidly moved into alignment, the wireless power receiver 122 may experience a current spike that may damage the components of the wireless power receiving apparatus 120. In conventional wireless power systems, the current spike may not be distinguishable from other current spikes that are caused by the load. Some current spikes that result from misalignment issues may be larger than those caused by the load. As a result, the wireless power receiver 122 may be unprepared to handle such larger current spikes, which may result in damaged components. Thus, the power may be reduced so that the amount of energy building up in the fringing magnetic fields is low enough so as to not damage the components of the wireless power receiving apparatus 120 if the user quickly moves the wireless power receiver 122 so that the transmit coil 114 and receive coil 124 are closer to alignment. If the transmitter control logic 218 detects that the alignment has improved, the wireless power transmitter 112 may raise the power again to more normal levels as the risk of damage caused by jittering has been reduced. In some embodiments, if the transmitter control logic 218 detects a rapid decrease in misalignment, the wireless power transmitter 112 responsively reduce (e.g., terminate) power transfer.

As shown in FIG. 3, the secondary sensing coils 219A, 219B, 219C, 219D may be positioned in proximity of the ferrite shield 302 around the outside perimeter of the transmit coil 214; however, other locations are contemplated. For example, the secondary sensing coils 219A, 219B, 219D may be positioned just outside of the ferrite shield 302, on the ferrite shield 302, on the transmit coil 214, on or within the core of the transmit coil 214, or some other location that is within the magnetic flux field during wireless power transfer. The location, orientation, geometry, etc. of the secondary sensing coils 219A, 219B, 219C, 219D may increase/decrease gain, make it easier/harder to fabricate, etc.

In some embodiments, each of the secondary sensing coils 219A, 219B, 219C, 219D may include a single loop coil. In some embodiments, each of the secondary sensing coils 219A, 219B, 219C, 219D may include a multiple loop coil. Some embodiments may include a combination of single loop coils and multiple loop coils for the secondary sensing coils 219A, 219B, 219C, 219D. The secondary sensing coils 219A, 219B, 219C, 219D may be formed from copper traces on a printed circuit board with the transmit coil 214 and the transmitter control logic 218. In some embodiments, each of the secondary sensing coils 219A, 219B, 219C, 219D may be formed as an external wire that is coupled to the PCB, embedded within the PCB, or that is embedded onto the transmit coil 214.

While four secondary sensing coils 219A, 219B, 219C, 219D are shown in FIG. 3 (and other figures), more or fewer secondary sensing coils may be used depending on the number of measurements desired, and locations of the measurements. In general, the more secondary sensing coils that are used, the sample points may be received to obtain a better understanding of the magnetic flux field. In addition, in some embodiments the secondary sensing coils 219A, 219B, 219C, 219D may be routed in at least one turn, and in some embodiments in more than one turn depending on the stray magnetic flux to find the necessary voltage. In some embodiments, the secondary sensing coils 219A, 219B, 219C, 219D may be positioned in the same 2D plane as the transmit coil 214. In some embodiments, one or more secondary sensing coils 219A, 219B, 219C, 219D may be positioned in another 2D plane. In other words, one or more of the secondary sensing coils 219A, 219B, 219C, 219D may be positioned in 3D space relative to the transmit coil 214.

In some embodiments, each secondary sensing coils 219A, 219B, 219C, 219D may be individually coupled as inputs to the transmitter control logic 218 to provide an independent measurement for each secondary sensing coils 219A, 219B, 219C, 219D. In some embodiments, one or more secondary sensing coils 219A, 219B, 219C, 219D may be coupled together to combine measurements in a summation or subtractive manner. Such combinations may include pairs of secondary sensing elements, while additional secondary sensing elements (i.e., three or more secondary sensing elements) may also be combined to provide different combinations of additive and/or subtractive measurements.

Figure 4:
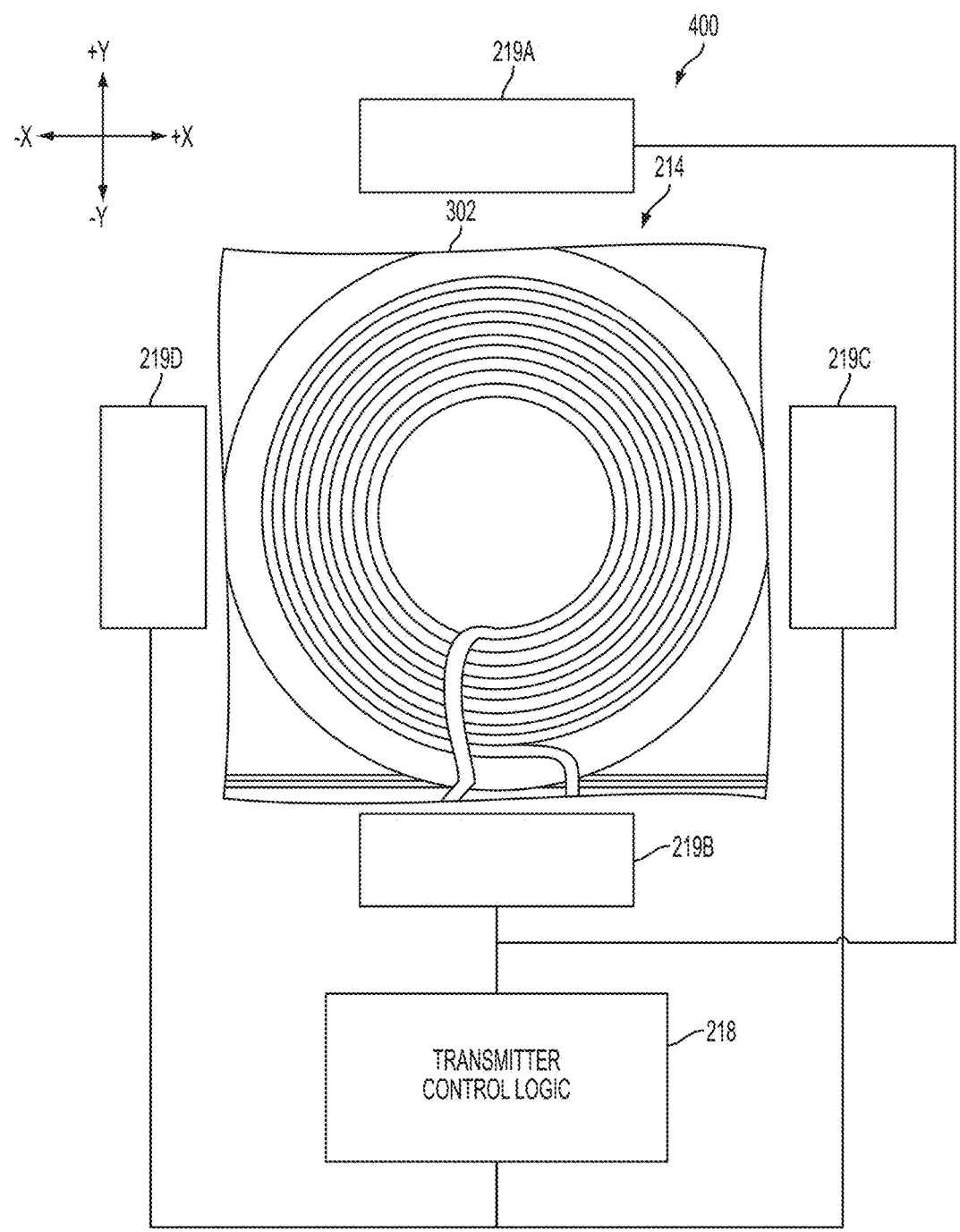
FIG. 4 is a schematic diagram of a wireless power transmitter with secondary sensing coils.

FIG. 4 is a schematic diagram of a wireless power transmitter 400 with secondary sensing coils 219A, 219B, 219C, 219D according to an embodiment of the disclosure. As shown in FIG. 4, the secondary sensing coils 219A, 219B, 219C, 219D may be grouped in pairs that are coupled together to a common input pin of the transmitter control logic 218. For example, the secondary sensing coils 219A, 219B that align in the y-direction may be coupled to a first input pin of the transmitter control logic 218. Likewise, the secondary sensing coils 219C, 219D that align in the x-direction may be coupled to a second input pin. Each pair of secondary sensing coils 219A, 219B, 219C, 219D may be configured to be additive or subtractive, as desired.

In some embodiments, each pair of secondary sensing coils 219A, 219B, 219C, 219D may be counter wound with each other. For example, the first secondary sensing coil 219A may be counter wound with the second secondary sensing coil 219B. Likewise, the third secondary sensing coil 219C may be counter wound with the fourth secondary sensing coil 219D.

If the pairs of secondary sensing coils 219A, 219B, 219C, 219D are configured to be subtractive, the signals from each pair may substantially cancel each other out if the transmit coil 214 and the receive coil 224 are aligned because of the symmetric nature of the magnetic flux field. For example, the first secondary sensing coil 219A and the second secondary sensing coil 219B may each generate a 2V signal, but these signals may cancel each other out with the secondary sensing coils 219A, 219B being counter wound so that the signals have opposite polarities. Similarly, the third secondary sensing coil 219C and the fourth secondary sensing coil 219D may each generate a 2V signal, but these signals may cancel each other out with the secondary sensing coils 219C, 219D being counter wound so that the signals have opposite polarities. Thus, the inputs to the transmitter control logic 218 during wireless power transmission may each be approximately 0V, which may indicate that the transmit coil 214 and the receive coil 224 are aligned.

As the receive coil 224 moves off-alignment in the +Y direction, the signal generated by the first secondary sensing coil 219A may increase while the signal generated by the second secondary sensing coil 219B may decrease. As a result, the combined signal input into the transmitter control logic 218 may be a positive voltage. Similarly, as the receive coil 224 moves off-alignment in the −Y direction, the signal generated by the second secondary sensing coil 219B may increase while the signal generated by the first secondary sensing coil 219A may decrease. As a result, the combined signal input into the transmitter control logic 218 may be a negative voltage.

As the receive coil 224 moves off-alignment in the +X direction, the signal generated by the third secondary sensing coil 219C may increase while the signal generated by the fourth secondary sensing coil 219D may decrease. As a result, the combined signal input into the transmitter control logic 218 may be a positive voltage. Similarly, as the receive coil 224 moves off-alignment in the −X direction, the signal generated by the fourth secondary sensing coil 219D may increase while the signal generated by the third secondary sensing coil 219C may decrease. As a result, the combined signal input into the transmitter control logic 218 may be a negative voltage.

The above example describes the situation when the pairs of secondary sensing coils 219A, 219B, 219C, 219D are configured to be subtractive. The pairs of secondary sensing coils 219A, 219B, 219C, 219D may be configured to sum the signals in some embodiments. As a result, the inputs for the aligned state may be a value that is not zero, from which the input values may change responsive to misalignment occurring.

Figure 5:
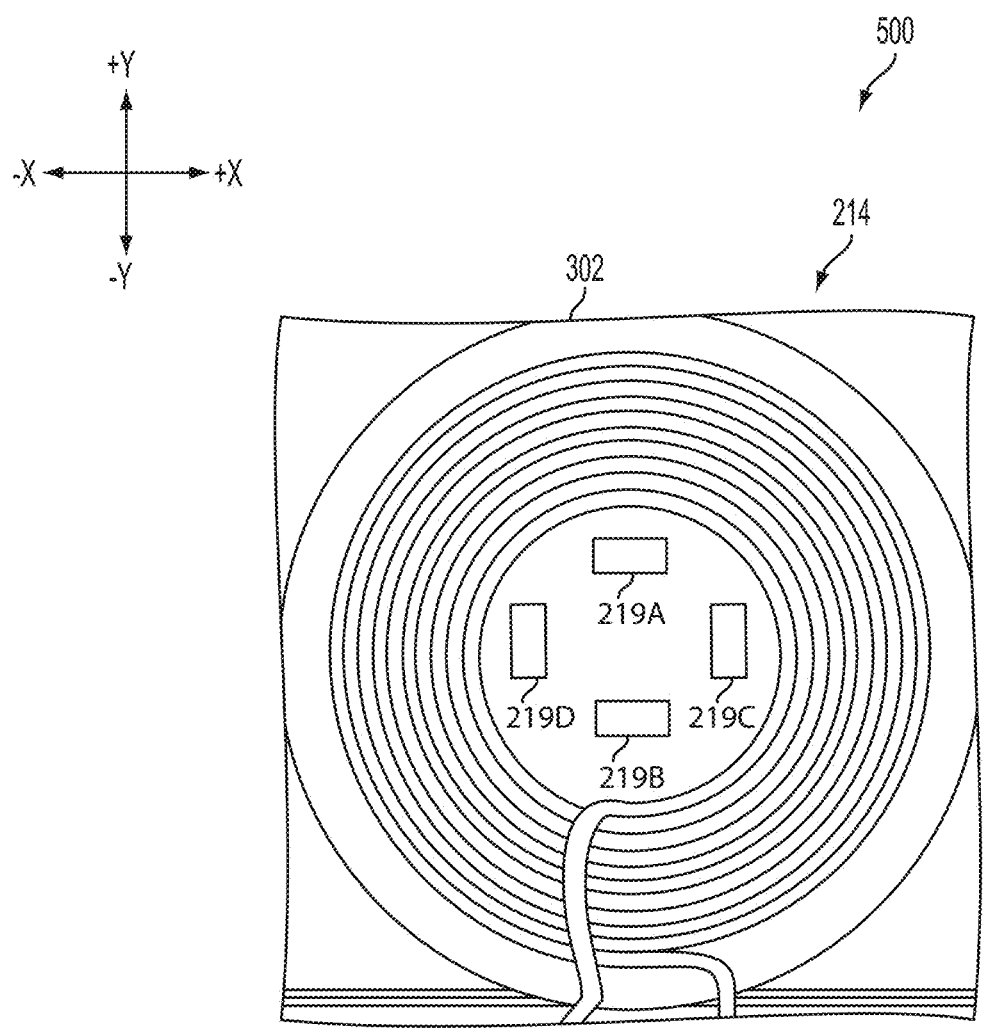
FIG. 5 is a schematic diagram of a wireless power transmitter with secondary sensing coils.

FIG. 5 is a schematic diagram of a wireless power transmitter 500 with secondary sensing coils 219A, 219B, 219C, 219D according to an embodiment of the disclosure. As shown in FIG. 5, the secondary sensing coils 219A, 219B, 219C, 219D may be positioned within the central area of the transmit coil 214. The magnetic flux field may also distort within this region as well responsive to conditions of the wireless power transfer system 100, which may be detected by the secondary sensing coils 219A, 219B, 219C, 219D. This central area may be open to provide space for the secondary sensing coils 219A, 219B, 219C, 219D without increasing the thickness needed for the secondary sensing coils 219A, 219B, 219C, 219D. In some embodiments, each of the secondary sensing coils 219A, 219B, 219C, 219D may be independently coupled to the transmitter control logic 218 as discussed above with respect to FIG. 3. In some embodiments, at least some of the secondary sensing coils 219A, 219B, 219C, 219D may be coupled together to a common input as discussed above with respect to FIG. 4.

In additional embodiments, there may be more than one wireless power transmitter 112 and more than one wireless power receiver 122 within a single wireless power transfer system 100. As the number of wireless power transmitters 112 and the number of wireless power receivers 122 increase, the problems and combinations may become more complex as the fringing fields from neighboring coils may interact with each other.

Figure 6:
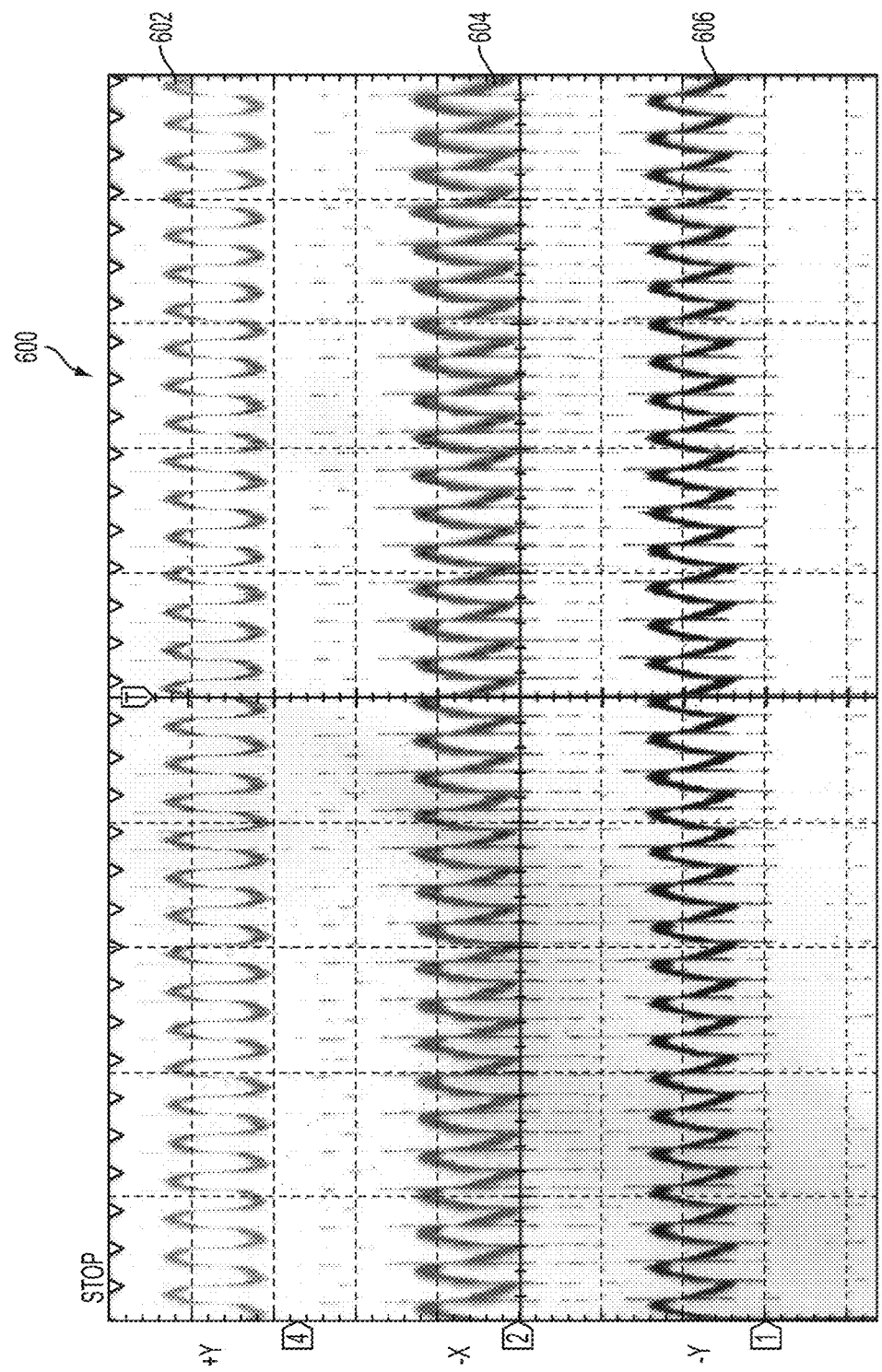
FIGS. 6, 7, and 8 are plots showing the outputs from secondary sensing coils responsive to various conditions of a wireless power transfer system.
Figure 7:
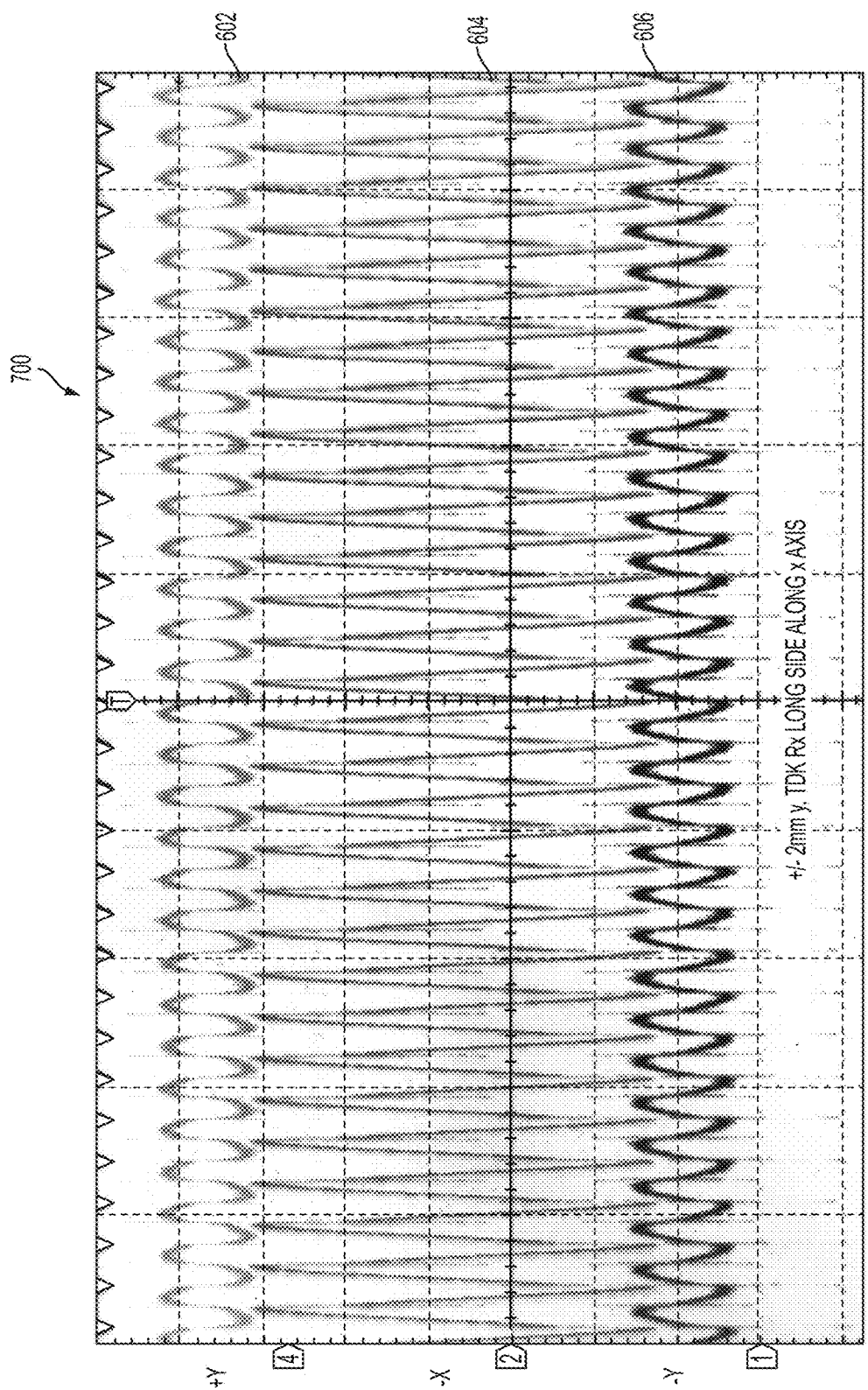
Figure 8:
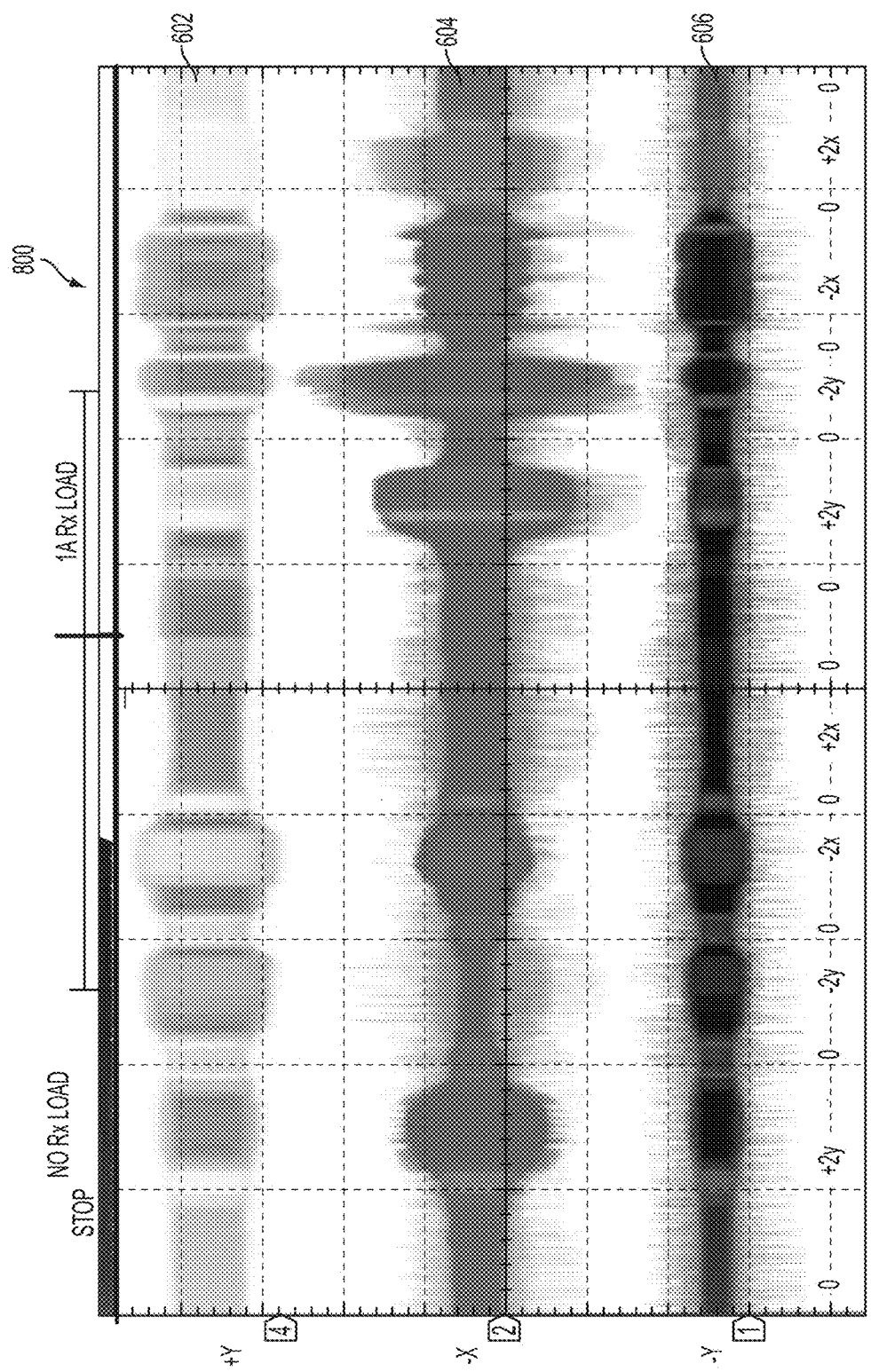

FIGS. 6, 7, and 8 are plots 600, 700, 800 showing the outputs from secondary sensing coils responsive to various conditions of a wireless power transfer system. Each of these plots show three signals 602, 604, 606 that are generated by secondary sensing coils at the +Y, −X, and −Y positions, respectively. These signals 602, 604, 606 are also monitored as continuous AC signals from an oscilloscope. As discussed above, such signals 602, 604, 606 may be sampled and processed as digital signals by the transmitter control logic 218. Finally, it is further noted that the signals 602, 604, 606 are shown as independent signals; however, one or more may be coupled together if desired (e.g., to reduce the number of input pins to the transmitter control logic 218).

Referring specifically to FIG. 6, this plot 600 represents the aligned state of the transmit coil 214 and the receive coil 224. In particular, the three signals 602, 604, 606 each have peak values that are approximately the same. Each of these peak values (or RMS) values may be considered the base value (referred to above as the "1" value) indicating alignment in that direction.

Referring specifically to FIG. 7, this plot 700 represents a misaligned state where the receive coil 224 has been moved in the −X direction. As a result, the signal 604 associated with the −X direction increases.

Referring specifically to FIG. 8, this plot 800 represents various states where the receive coil 224 moves between different states of alignment and misalignment. In particular, along the horizontal axis of the plot 800, "0" represents alignment, "+2y" represents 2 mm misalignment in the +Y direction, "−2y" represents 2 mm misalignment in the −Y direction, "+2x" represents 2 mm misalignment in the +X direction, "−2x" represents 2 mm misalignment in the −X direction. The first half of the plot 800 shows a condition of there being no load coupled with the wireless power receiver, and the second half of the plot 800 shows a condition of there being a 1 A load coupled with the wireless power receiver.

As shown in the plot 800, the different signals 602, 604, 606 may change responsive to the wireless power receiver is moved to different positions. As shown, moving the wireless power receiver in one direction may have some effect on all signals 602, 604, 606—not just the one in that direction. Thus, each of these signals 602, 604, 606 may be sampled at each position to obtain reference combination measurements that are associated with the particular state of misalignment.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor.

What is claimed is:

1. A wireless power transmitter, comprising:
   a transmit coil configured to generate a wireless power signal for wireless power transfer to a wireless power receiver;
   at least one secondary sensing coil positioned adjacent to, coplanar with, and positioned outside of the transmit coil and configured to generate a signal responsive to a magnetic flux field generated during the wireless power transfer; and
   control logic operably coupled with the at least one secondary sensing coil, the control logic configured to detect a misalignment between the transmit coil and the wireless power receiver responsive to detecting distortion in the magnetic flux field from the signal received from the at least one secondary sensing coil.

2. The wireless power transmitter of claim 1, wherein the at least one secondary sensing coil includes a plurality of secondary sensing coils operably coupled with the control logic.

3. The wireless power transmitter of claim 2, wherein each secondary sensing coil of the plurality of secondary sensing coils is independently coupled to the control logic to provide individual signals thereto.

4. The wireless power transmitter of claim 2, wherein at least two secondary sensing coils of the plurality of secondary sensing coils are coupled together to a common input of the control logic.

5. The wireless power transmitter of claim 4, wherein the at least two secondary sensing coils are counter wound relative to each other.

6. The wireless power transmitter of claim 4, wherein the at least two secondary sensing coils are configured to sum their respective signals to provide to the common input of the control logic.

7. The wireless power transmitter of claim 4, wherein the at least two secondary sensing coils are configured to subtract their respective signals to provide to the common input of the control logic.

8. The wireless power transmitter of claim 2, wherein the plurality of secondary sensing coils are coupled around an outside periphery of the transmit coil.

9. The wireless power transmitter of claim 2, wherein the plurality of secondary sensing coils are positioned within an inner area of the transmit coil.

10. A wireless power enabled apparatus, comprising: a wireless power transmitter including:
    a transmit coil configured to generate a wireless power signal from an input signal; a plurality of secondary sensing coils located in proximity of, adjacent to, coplanar with, and positioned outside of the transmit coil, each secondary sensing coil configured to generate a signal of a magnetic flux field generated during wireless power transfer to a wireless power receiver; and
    control logic operably coupled with the plurality of secondary sensing coils, the control logic configured to detect a misalignment between the transmit coil and the wireless power receiver based, at least in part, on a measured combination of inputs from the signals generated by the plurality of secondary sensing coils.

11. The wireless power enabled apparatus of claim 10, wherein the plurality of secondary sensing coils include a first secondary sensing coil and a second secondary sensing coil located along a y-axis, and a third secondary sensing coil and a fourth secondary sensing coil located along an x-axis, wherein:

the first secondary sensing coil is located along the y-axis at a +Y location;

the second secondary sensing coil is located along the y-axis at a −Y location; the third secondary sensing coil is located along the x-axis at a +X location; and the fourth secondary sensing coil is located along the x-axis at a −X location.

12. The wireless power enabled apparatus of claim 10, wherein each secondary sensing coil of the plurality of secondary sensing coils include is configured as one of a single loop coil and a multiple loop coil.

13. The wireless power enabled apparatus of claim 10, wherein the control logic is further configured to detect a presence of a foreign object within the magnetic flux field.

14. The wireless power enabled apparatus of claim 10, wherein the control logic is further configured to determine an amount of misalignment based, at least in part, on a comparison of the measured combination of inputs with a plurality of reference measurement combinations stored in memory of the control logic.

15. The wireless power enabled apparatus of claim 13, wherein the control logic is further configured to determine the presence of the foreign object based, at least in part, on a comparison of the measured combination of inputs with alignment information stored in memory of the control logic.

16. A method of detecting a misalignment from a wireless power transmitter, the method comprising:

generating with the wireless power transmitter a wireless power signal for wireless power transfer to a wireless power receiver;

generating with a plurality of secondary sensing coils positioned adjacent to, outside of, and coplanar with a transmit coil of the wireless power transmitter, one or more signals responsive to a magnetic flux field generated during the wireless power transfer; and detecting the misalignment of a wireless power transfer system responsive to the one or more signals generated by the plurality of secondary sensing coils.

17. The method of claim 16, further including detecting a presence of a foreign object within the magnetic flux field detected by the plurality of secondary sensing coils.

18. The method of claim 17, further including sampling the one or more signals according to a sampling frequency.

19. The method of claim 17, further comprising at least one of: notifying a user of the misalignment of the transmit coil and a receive coil; and notifying the user of the presence of the foreign object.

20. The method of claim 17, further comprising at least one of:

reducing a power level for the wireless power signal responsive to a detection of misalignment of the transmit coil and a receive coil;

reducing the power level for the wireless power signal responsive to a detection of the presence of the foreign object within the magnetic flux field;

reducing a power level for the wireless power signal responsive to a detection of a rapid reduction of misalignment of the transmit coil and the receive coil;

increasing the power level for the wireless power signal responsive to a determination that the misalignment of the transmit coil and the receive coil has been reduced; and increasing the power level for the wireless power signal responsive to a determination that the foreign object has been removed from the magnetic flux field.

* * * * *